United States Patent [19]

Sjardijn et al.

[11] Patent Number: 4,729,976

[45] Date of Patent: Mar. 8, 1988

[54] POLYMER OF DICYCLOPENTADIENE AND A PROCESS FOR PREPARATION

[75] Inventors: Willem Sjardijn; Arris H. Kramer, both of Amsterdam, Netherlands

[73] Assignee: Shell Oil Company, Houston, Tex.

[21] Appl. No.: 923,549

[22] Filed: Oct. 27, 1986

[30] Foreign Application Priority Data

Oct. 28, 1985 [GB] United Kingdom ............... 8526539

[51] Int. Cl.$^4$ .................................................. C08F 4/62
[52] U.S. Cl. ..................................... 502/102; 502/154; 526/166
[58] Field of Search .......................... 502/154, 102

[56] References Cited

U.S. PATENT DOCUMENTS 3,627,739 12/1971 Devlin et al. ................. 260/88.2 D
3,806,467 4/1974 Watanabe et al. .................. 502/154

FOREIGN PATENT DOCUMENTS 0084888 8/1983 European Pat. Off. .
1389979 4/1975 United Kingdom .

*Primary Examiner*—Patrick P. Garvin

[57] ABSTRACT

The invention is a process for preparing a polymer which comprises contacting dicyclopentadiene with a catalyst comprising a phenolic substituted tungsten halide and a trialkyltin hydride or triphenyltin hydride and recovering said polymer. The invention is also a polymer of dicyclopentadiene as prepared in the process of the invention and a catalyst used in the process of the invention to prepare said polymer.

8 Claims, No Drawings

POLYMER OF DICYCLOPENTADIENE AND A PROCESS FOR PREPARATION

FIELD OF THE INVENTION

The invention is a process for the bulk polymerization of dicyclopentadiene, the dicyclopentadiene polymer prepared by this process and the catalyst used in the process.

BACKGROUND OF THE INVENTION

It is known from U.S. Pat. No. 3,627,739 to polymerize dicyclopentadiene (abbreviated DCPD) to polydicyclopentadiene (poly DCPD) with the aid of a tungsten catalyst. The obtained poly DCPD is rather brittle and has a low Izod impact strength. Efforts have been made to improve this product and European Patent Application No. 84,888 discloses a method to prepare poly DCPD with improved properties. Application No. 84,888 also discloses a process for the polymerization in bulk of DCPD with the aid of a metathesis catalyst system, comprising e.g. phenol substituted tungsten hexachloride together with an activator, e.g. ethyl aluminum dichloride, and diethyl ammonium chloride or tetrabutyl tin. The application further discloses that the DCPD used should be purified in order to prevent impurities from inhibiting the polymerization. It is stressed that it is often desirable to purify the starting materials even further by treatment with silica.

Applicant has now found a versatile metathesis catalyst system for the polymerization of DCPD in bulk, which is more stable, less sensitive to oxygen and moreover can polymerize DCPD of impure quality.

SUMMARY OF THE INVENTION

The invention is a process for preparing a polymer which comprises contacting dicyclopentadiene with a catalyst comprising (a) a tungsten compound having the formula

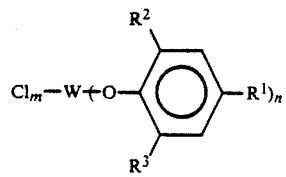

wherein $R^2$ is an alkyl group having at least 3 carbon atoms and $R^3$ is selected from the group consisting of an hydrogen atom and a bulky alkyl group having at least 3 carbon atoms, $R^1$ is selected from the group consisting of an hydrogen atom and an alkyl group of 1 to 10 carbon atoms, (m+n) is equal to 6 and n is 1 or 2, and (b) a tin compound having the formula

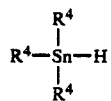

wherein $R^4$ is selected from the group consisting of a phenyl group, and an alkyl group having 1 to 10 carbon atoms, under conditions effective to prepare a polymer of dicyclopentadiene and recovering said polymer. The invention is also said polymer of dicyclopentadiene as prepared in the process of the invention and the invention is a catalyst used in the process of the invention to prepare said polymer.

DETAILED DESCRIPTION OF THE INVENTION

It has been found that the tin compound of the present invention process, in contrast with aluminum compounds used in other processes, are much less sensitive to oxygen, and consequently nitrogen atmospheres do not need to be used in the process according to the invention.

It has also been found that the use of tetrabutyl tin, together with the above-defined tungsten compound did not polymerize DCPD. Tetramethyl tin and tetraethyl tin did not work either.

The above-mentioned European Patent Application No. 84,888 discloses that an unmodified tungsten compound, such as phenol substituted tungsten hexachloride, will rapidly polymerize DCPD. To prevent premature polymerization of the tungsten compound/DCPD solution a Lewis base or a chelating agent can be added. The use of $WCl_6$, often mentioned in the general prior art as one of the components of a metathesis catalyst, is not desirable in the process according to the present invention.

The tungsten compounds used as catalyst component in the process according to the invention contain in the phenyl nucleus a bulky alkyl group, preferably an isopropyl group, a tertiary butyl group or a neo-pentyl group.

Suitable tungsten compounds may be represented by the following chemical formulas

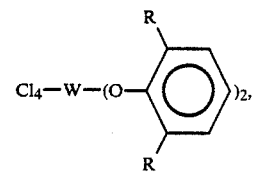

wherein R is isopropyl, and

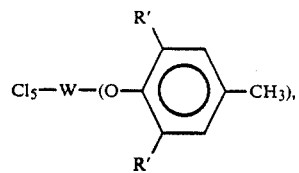

wherein R' is tert-butyl

These two chemical formulae represent the reaction product obtained by reacting tungsten hexachloride with an appropriate amount of 2,6-diisopropyl phenol and 2,6-di-tert-butyl-4-methylphenol respectively.

Of the trialkyl tin hydrides, suitable for use in the process of the invention, those in which the alkyl group contains 1 to 6 carbon atoms are preferred, the tributyl tin hydride being most preferred. Triphenyl tin hydride may also be used.

As stated already hereinbefore the DCPD may be of an impure grade, such as commercially available endo-DCPD. A technical grade of DCPD contains about 5 to 6 percent by weight of codimers.

The amount of the tungsten compound catalyst component used in the process according to the invention may range from 0.01 to 1 mol %, preferably from 0.02 to 0.1 mol %, calculated on the amount of DCPD.

The mol ratio of the tin compound versus the tungsten compound ranges from 15:1 to 1:1, preferably from 12:1 to 3:1.

It is observed, that anti-oxidants (such as Ionol), moisture and oxygen do not disturb the polymerization.

Generally the polymerization takes place in bulk, but the catalyst components, viz. the above-defined tungsten compound and the tin compound, may be dissolved in a small amount of solvent, such as toluene. It is preferred however, to use, DCPD as a solvent. In case of the tin compound no solvent at all may also suffice, since the tin compound is a liquid.

A preferred method for the polymerization of DCPD is to contact a tungsten compound catalyst component stream with a tin compound catalyst component stream whereby at least one of the streams contains the DCPD, and to polymerize the DCPD. For example it is possible to dissolve the tungsten catalyst in DCPD and either to dissolve the tin catalyst in DCPD or in another solvent or to use the tin catalyst without any solvent.

After both streams have contacted with each other, the resulting mixture may be injected or poured into a mold, where the polymerization takes place. The polymerization is exothermic, but heating the mold from about 50° to 100° C. is preferred.

The tin catalyst as well as the tungsten catalyst may be stored in DCPD for some time, provided that the DCPD contains only a few ppms of water or less. The tin catalyst is storable in DCPD during one or two months without loosing its activity. Even the tungsten catalyst and the catalyst prepared in Example 2 hereinafter admixed with each other in dry DCPD under nitrogen may be stored for one day, without loosing activity.

The properties of the poly DCPD, obtained by the process according to the invention are:

| | | |
|---|---|---|
| Hardness shore D | | 65-80 |
| Compressive strength | MPa | 30-50 |
| Compressive modulus | GPa | 0.8-1.2 |
| Vicat soft. temp. (1 kg load) | °C. | 165-170 |
| Izod impact strength (British Standard notched) | kJ/m² | 6.0-9.5 |
| Flexural strength | MPa | 70-75 |
| Glass transition temp. | °C. | 95 |
| Flexural modulus | GPa | 1.7-1.8 |

During the polymerization of DCPD, fillers, anti-oxidants, stabilizers, pigments, plasticizers may be present in the reaction mixture.

The catalyst system used is specifically of interest for reaction injection molding or casting. Because of the low viscosity of the DCPD/catalyst system, the polymerization is very suitable for large castings with intricate molds.

Polymerization temperatures of up to 200° C. are reached in exothermic reactions.

The poly DCPD obtained by the process according to the invention may be subjected to a heat-treatment of 200° C. to 300° C. for about 1 hour or longer. After this heat-treatment the glass transition temperature of the polymer has been increased to about 160° C.

This post-curing treatment may be beneficial to certain uses of the poly DCPD.

The invention further relates to a two component catalyst system, comprising (a) a tungsten compound of the formula

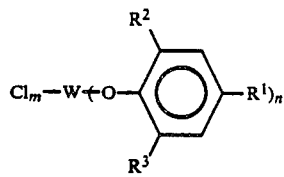

wherein $R^2$ is a bulky alkyl group having at least 3 carbon atoms and $R^3$ is selected from the group consisting of a hydrogen atom and a bulky alkyl group having at least 3 carbon atoms, and n is 1 or 2, (b) a tin compound of the formula

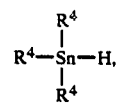

wherein $R^4$ is selected from the group consisting of a phenyl group, and an alkyl group having 1 to 10 carbon atoms.

The two component catalyst system may form part of a package wherein at least one of the components is dissolved in dicyclopentadiene.

It is possible to manufacture drums containing DCPD together with a pre-determined amount of one of the components, e.g. the tungsten catalyst and drums containing DCPD with the tin catalyst in an amount adapted to the desired mol ratio of components to be used in the polymerization of DCPD.

The invention will be illustrated with the following examples. The examples are given for the purpose of illustration only and the invention is not to be regarded as limited to any of the specific materials or conditions used in the examples.

EXAMPLE 1 (PREPARATION OF CATALYST 1)

2 g of $WCl_6$ was weighed in a 100 ml dried serum cap bottle and dissolved in 40 ml of dried toluene under a dry nitrogen blanket. 1.73 ml of dried 2,6-diisopropylphenol was added slowly at 100° C. The evolved HCl was collected in an excess of aqueous sodium hydroxide solution. The reaction mixture was kept for 4 h at 100° C. The product was isolated by evaporation of the solvent and is referred to herein as catalyst 1.

EXAMPLE 2 (PREPARATION OF CATALYST 2)

4 g of $WCl_6$ was weighed in a 100 ml dried serum cap bottle and dissolved in 20 ml of dried toluene under a dry nitrogen blanket. A solution of 6.6 g dried 2,6-di-tert-butyl-4-methylphenol (Ionol) in 20 ml of dried toluene was added slowly at 90° C. The evolved HCl was collected in an excess of aqueous sodium hydroxide solution. The reaction mixture was kept for 4 h at 95° C. The product was isolated by evaporation of the solvent and is referred to herein as catalyst 2.

In the polymerization experiments a technical grade of DCPD was used, which contained:
3.5% isopropenyl-2-norbornene
1.1% 5-cis and trans-1-propenyl-2-norbornene
0.7% 5-methyl tetrahydroindene
70 ppm water If dry DCPD was used, it contained less than 1 ppm of water.

EXAMPLE 3

0.08 g of catalyst 1 was dissolved in 40 g of DCPD in a 100 ml serum cap bottle. 3 ml of a 0.2 mol/l solution of tributyl tin hydride in toluene was added at ambient temperature by means of a hypodermic syringe. The bottle was shaken thoroughly and placed in an oil-bath of 90° C. The reactive mix gelled very rapidly and an exothermic polymerization was observed. A maximum temperature of 200° C. after 4, 5 minutes from initiation was observed.

EXAMPLE 4

0.09 g of catalyst 1 was dissolved in 40 g of DCPD in a 100 ml serum cap bottle. 2.5 ml of a 0.3 mol/l solution of triphenyl tin hydride in toluene was added at ambient temperature by means of a hypodermic syringe. The bottle was shaken thoroughly and placed in an oil-bath of 90° C. An xothermic polymerization was observed for which a maximum temperature of 160° C. after 4, 5 minutes from initiation was recorded.

EXAMPLE 5

0.07 g of catalyst 2 was dissolved in 40 g of DCPD in a 100 ml serum cap bottle. 2.5 ml of a 0.25 mol/l tributyl tin hydride solution in toluene was added at ambient temperature by means of a hypodermic syringe. The bottle was shaken thoroughly and placed in an oil-bath of 90° C. An exothermic polymerization was observed for which a maximum temperature of 150° C. after 11 minutes from initiation was recorded.

EXAMPLE 6 (COMPARATIVE EXPERIMENT)

0.08 g of catalyst 1 was dissolved in 40 g of DCPD in a 100 ml serum cap bottle. 2 ml of a 0.3 mol/l tetramethyl tin solution in toluene was added at ambient temperature by means of a hypodermic syringe. The bottle was shaken thoroughly and placed in an oil-bath of 90° C. No polymerization at all was observed.

EXAMPLE 7

0.08 g of catalyst 1 together with 0.08 g of Ionol were dissolved in 40 g dried DCPD and stored at room temperature. After six days 2 ml of a 0.3 mol/l solution of tributyl tin hydride in toluene was added. The bottle was shaken thoroughly and placed in an oil-bath of 90° C. An exothermic polymerization was observed for which a maximum temperature of 195° C. after 3 minutes from initiation was recorded.

EXAMPLE 8

0.07 g of catalyst 2 was dissolved in 40 g of dried DCPD and stored at room temperature. After 7 days 2 ml of a 0.3 mol/l solution of tributyl tin hydride in toluene was added. The bottle was shaken thoroughly and placed in an oil-bath of 90° C. An exothermic polymerization was observed with a $T_{max}$ of 200° C. after 14 minutes from initiation.

EXAMPLE 9

0.022 g of tributyl tin hydride was dissolved in 10 g of dried DCPD and stored at room temperature. After 31 days this solution was added to a freshly prepared solution of 0.02 g of catalyst 1 in 10 ml of dried DCPD. The reactive mix was homogenized and heated in an oil-bath of 90° C. An exothermic polymerization was observed with a $T_{max}$ of 170° C.

EXAMPLE 10

0.25 g of catalyst 2 was dissolved in 105 g of dried DCPD. 5.8 ml of a 0.3 mol/l solution of tributyl tin hydride in toluene was added. The mixture was homogenized and stored in contact with the atmosphere. After 1 day 40 ml of the mixture, which was still a thin liquid, was heated till 90° C. in an oil-bath. An exothermic polymerization was still observed with a $T_{max}$ of 170° C.

EXAMPLE 11

0.5 g of catalyst 2 was dissolved in 350 g of technical DCPD in contact with the atmosphere. 1.4 ml of tributyl tin hydride was added whereafter the solution was thoroughly homogenized in contact with the atmosphere.

The reactive mix was poured in a preheated (110° C.) aluminum mold of 35×10×1 cm. The mold was kept at 110° C. for 45 minutes whereafter the temperature was raised to 200° C. at which temperature the mold was kept for another 45 minutes. After cooling a polymer sheet was extracted from the mold which was free from amy DCPD odor.

EXAMPLE 12 (COMPARATIVE EXPERIMENT)

0.086 g of catalyst 2 was dissolved in 20 g dry DCPD in a 100 ml serum cap bottle. 0.257 g tetrabutyl tin in 20 g dry DCPD was added at room temperature by means of a hypodermic syringe. The bottle was shaken thoroughly and placed in an oil-bath of 90° C. No polymerization at all was observed.

What is claimed is:

1. A catalyst composition for the preparation of a polymer of dicyclopentadiene which comprises
  (a) a tungsten compound having the formula

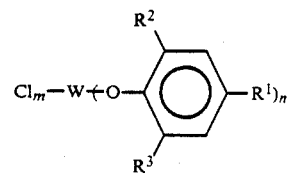

wherein $R^2$ is a bulky alkyl group having at least 3 carbon atoms and $R^3$ is selected from the group consisting of an hydrogen atom and a bulky alkyl group having at least 3 carbon atoms, $R^1$ is selected from the group consisting of an hydrogen atom and an alkyl group of 1 to 10 carbon atoms, (m+n) is equal to 6 and n is 1 or 2, and
  (b) a tin compound having the formula

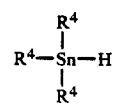

wherein $R^4$ is selected from the group consisting of a phenyl group, and an alkyl group having 1 to 10 carbon atoms.

2. The catalyst of claim 1 wherein the tungsten compound has the formula

3. The catalyst of claim 1 wherein the tungsten compound has the formula

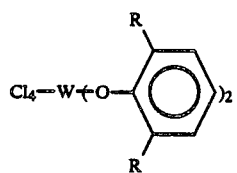

wherein R is a isopropyl group.

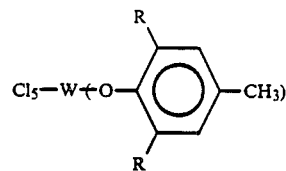

wherein R is a tertiary butyl group.

4. The catalyst of claim 1 wherein the tungsten compound is bis(2,6-isopropylphenoxy) tungsten tetrachloride.

5. The catalyst of claim 1 wherein the tungsten compound is 2,6-di-tert-butyl-4-methylphenoxy tungsten pentachloride.

6. The catalyst of claim 1 wherein $R^4$ is selected from the group consisting of an alkyl group having 1 to 6 carbon atoms.

7. The catalyst of claim 1 wherein the tin compound is tributyl tin hydride.

8. The catalyst of claim 1 wherein the tin compound is triphenyl tin hydride.

* * * * *